United States Patent
Wu et al.

(10) Patent No.: US 9,829,175 B2
(45) Date of Patent: Nov. 28, 2017

(54) OPTICAL LENS, BACKLIGHT MODULE AND DISPLAY DEVICE

(71) Applicants: Radiant Opto-Electronics (Suzhou) Co., Ltd., Jiangsu (CN); Radiant Opto-Electronics Corporation, Kaohsiung (TW)

(72) Inventors: Tsung-Tse Wu, Kaohsiung (TW); Chun-Hsien Li, Kaohsiung (TW); Pei-Ling Kao, Kaohsiung (TW); Yen-Chang Lee, Kaohsiung (TW)

(73) Assignees: Radiant Opto-Electronics (Suzhou) Co., Ltd., Jiangsu (CN); Radiant Opto-Elecctronics Corporation, Kaohsiung (TW)

( * ) Notice: Subject to any disclaimer, the term of this patent is extended or adjusted under 35 U.S.C. 154(b) by 0 days.

(21) Appl. No.: 15/032,627

(22) PCT Filed: Dec. 29, 2015

(86) PCT No.: PCT/CN2015/099424
§ 371 (c)(1),
(2) Date: Apr. 27, 2016

(87) PCT Pub. No.: WO2016/188108
PCT Pub. Date: Dec. 1, 2016

(65) Prior Publication Data
US 2017/0122524 A1    May 4, 2017

(30) Foreign Application Priority Data
May 26, 2015  (CN) .......................... 2015 1 0274598

(51) Int. Cl.
*G09F 13/04*  (2006.01)
*F21V 5/02*  (2006.01)
*F21V 7/05*  (2006.01)

(52) U.S. Cl.
CPC . *F21V 5/02* (2013.01); *F21V 7/05* (2013.01)

(58) Field of Classification Search
CPC . G02F 1/133604; G02F 1/133608; F21V 5/02
(Continued)

(56) References Cited

U.S. PATENT DOCUMENTS 7,618,164 B2 * 11/2009 Wang .................. G02B 5/0221
                                                   359/831
2006/0083003 A1 * 4/2006 Kim ......................... F21V 5/04
                                                   362/327

(Continued)

FOREIGN PATENT DOCUMENTS

CN          103032817 A     4/2013
CN          103322504 A     9/2013
(Continued)

*Primary Examiner* — Ahshik Kim
(74) *Attorney, Agent, or Firm* — CKC & Partners Co., Ltd.

(57) ABSTRACT

An optical lens, a backlight module and a display device are provided. The optical lens includes a main body, a light-incident surface, a recessed surface and a light-emitting surface. The main body has a top portion and a bottom portion. The light-incident surface is recessed into the bottom portion of the main body. The recessed surface is recessed into the top portion of the main body and is opposite to the light-incident surface, in which the recessed surface has a plurality of prism surfaces, and each of the prism surfaces has a normal line, and directions of the normal lines are different from each other. The light-emitting surface connects the top portion and the bottom portion.

17 Claims, 13 Drawing Sheets

(58) Field of Classification Search
USPC .......................................................... 362/97.1
See application file for complete search history.

(56) References Cited

U.S. PATENT DOCUMENTS

| | | | | |
|---|---|---|---|---|
| 2009/0109667 | A1* | 4/2009 | Cheng | ..................... F21V 5/04 |
| | | | | 362/227 |
| 2012/0169965 | A1* | 7/2012 | Tang | ................... G02B 6/0053 |
| | | | | 349/62 |
| 2014/0168994 | A1* | 6/2014 | Wang He | ................. F21V 5/04 |
| | | | | 362/311.02 |
| 2015/0109761 | A1* | 4/2015 | Huang | .............. G02F 1/133603 |
| | | | | 362/97.1 |
| 2015/0159831 | A1* | 6/2015 | Kang | ..................... F21V 5/007 |
| | | | | 362/240 |
| 2015/0309318 | A1* | 10/2015 | Bai | ................... G02B 27/0977 |
| | | | | 362/97.1 |

FOREIGN PATENT DOCUMENTS

| | | | |
|---|---|---|---|
| CN | 103322505 | A | 9/2013 |
| CN | 203771292 | U | 8/2014 |
| CN | 203784831 | U | 8/2014 |
| CN | 104061526 | A | 9/2014 |
| CN | 104583668 | A | 4/2015 |
| CN | 204808773 | U | 11/2015 |
| TW | M432143 | U1 | 6/2012 |

\* cited by examiner

OPTICAL LENS, BACKLIGHT MODULE AND DISPLAY DEVICE

RELATED APPLICATIONS

This application is the U.S. national phase under §371 of International Application No. PCT/CN2015/099424 filed Dec. 29, 2015, which claims priority from China Patent Application Serial Number 201510274598.8, filed May 26, 2015. The entire contents of each of which are incorporated by reference.

BACKGROUND

Field of Invention

The present invention relates to an optical element. More particularly, the present invention relates to an optical lens, a backlight module and a display device.

Description of Related Art

In order to meet the requirements of lightness and thinness for a direct type backlight module, a conventional method is to decrease a light-mixing distance of a secondary lens in the direct type backlight modules or to increase the number of the light-emitting diodes disposed therein.

The secondary lens mainly includes a refracting type lens and a reflecting type lens. A light-emitting angle of the refracting type lens is only about 75 degrees, and thus, the too large distance between any two adjacent light-emitting diodes (i.e. a LED pitch) will result in the problem of poor illumination uniformity. On the other hand, although the light-emitting angle of the reflecting type lens is larger than 90 degrees, yet the light-incident surface and the light-emitting surface of the reflecting type lens have to be designed as complicated curved surfaces. Because the formation of the complicated curved surfaces requires high precision, the manufacturing cost thereof is expensive. In addition, the reflecting type lens cannot be formed accurately due to the complicated curved surfaces, thus affecting its light-emitting effect.

SUMMARY

One object of the present invention is to provide an optical lens, a backlight module and a display device, which are easy to manufacture and have better illumination uniformity.

According to the aforementioned object, an optical lens is provided. The optical lens includes a main body, a light-incident surface, a recessed surface and a light-emitting surface. The main body has a top portion and a bottom portion. The light-incident surface is recessed into the bottom portion of the main body. The recessed surface is recessed into the top portion of the main body and is opposite to the light-incident surface, in which the recessed surface has a plurality of prism surfaces, and each of the prism surfaces has a normal line, and directions of the normal lines are different from each other. The light-emitting surface connects the top portion and the bottom portion.

According to an embodiment of the present invention, edges of any two adjacent prism surfaces are connected to each other.

According to an embodiment of the present invention, the recessed surface is a cone-like surface which has an end point, and the prism surfaces are arranged radially with respect to the end point.

According to an embodiment of the present invention, the recessed surface is a cone-like surface which has an end point, and the prism surfaces are arranged annularly with respect to the end point.

According to an embodiment of the present invention, the recessed surface is a cone-like surface which has an end point, and the prism surfaces are arranged annularly with respect to the end point. Each of the prism surfaces located away from the end point has an area greater than each of the prism surfaces located near the end point.

According to an embodiment of the present invention, each of the prism surfaces is triangular, quadrangular, rhombic, pentagonal, hexagonal fan-shaped polygonal irregular-shaped, or any combination thereof.

According to an embodiment of the present invention, the recessed surface further includes at least one optical surface, and the recessed surface is formed by jointing the prism surfaces and the optical surface together.

According to an embodiment of the present invention, the recessed surface is formed by jointing the prism surfaces together.

According to an embodiment of the present invention, the light-incident surface has a constant slope.

According to an embodiment of the present invention, the light-emitting surface has a constant slope.

According to the aforementioned object, a backlight module is provided. The backlight module includes a back plate, a reflector, at least one light source, the aforementioned optical lens and an optical plate. The reflector is disposed on the back plate. The light source is disposed on the back plate, in which the light source is used to provide light beam. The optical lens is disposed on the light source. The optical plate is disposed above the reflector. Therefore, after entering the main body of the optical lens from the light-incident surface, the light beam provided by the light source is reflected by the prism surfaces, and is emitted out from the light-emitting surface and then is emitted out from the optical plate.

According to an embodiment of the present invention, the reflector has at least one engaging portion, the optical lens is engaged with the engaging portion. The light source comprises a circuit board and at least one light-emitting unit disposed on the circuit board, in which the circuit board is disposed on the back plate, and the light-emitting unit is disposed under the optical lens.

According to an embodiment of the present invention, the main body further includes a light-incident space, and the light-incident surface is an inner surface of the light-incident space. The light-emitting unit is disposed under the light-incident space.

According to an embodiment of the present invention, the main body has at least one connecting pin disposed on the bottom portion, and the optical lens is disposed on the circuit board through the connecting pin so as to form an accommodating space between the optical lens and the circuit board.

According to the aforementioned object, a display device is provided. The display device includes a back plate, a reflector, at least one light source, the aforementioned optical lens, an optical plate and a display panel. The reflector is disposed on the back plate. The light source is disposed on the back plate, in which the light source is used to provide light beam. The optical lens is disposed on the light source. The optical plate disposed above the reflector. Therefore, after entering the main body of the optical lens from the light-incident surface, the light beam provided by the light source is reflected by the prism surfaces, and is emitted out from the light-emitting surface and then is emitted out from the optical plate. The display panel is disposed above the optical plate.

According to the aforementioned embodiments of the present invention, the optical lens of the invention uses a recessed surface as a reflecting surface by jointing the prism surfaces with different extending directions of normal lines together, so that the propagation paths of the light beam can be adjusted, and the light-emitting angles can be controlled accordingly. In addition, the propagation paths of the light beam can also be locally controlled by changing the arrangement manners, sizes or shapes of the prism surfaces. Therefore, the number of the optical lenses applied to the backlight module or the display device, and the overall thickness of the backlight module can be reduced, and the illumination uniformity of the backlight module or the display device can be enhanced. In addition, the light-incident surface or the light-emitting surface of each of the optical lenses in the present invention can be designed to have a constant slope, thereby simplifying the manufacturing process of the optical lenses, thus increasing forming precision of the optical lenses.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1A:
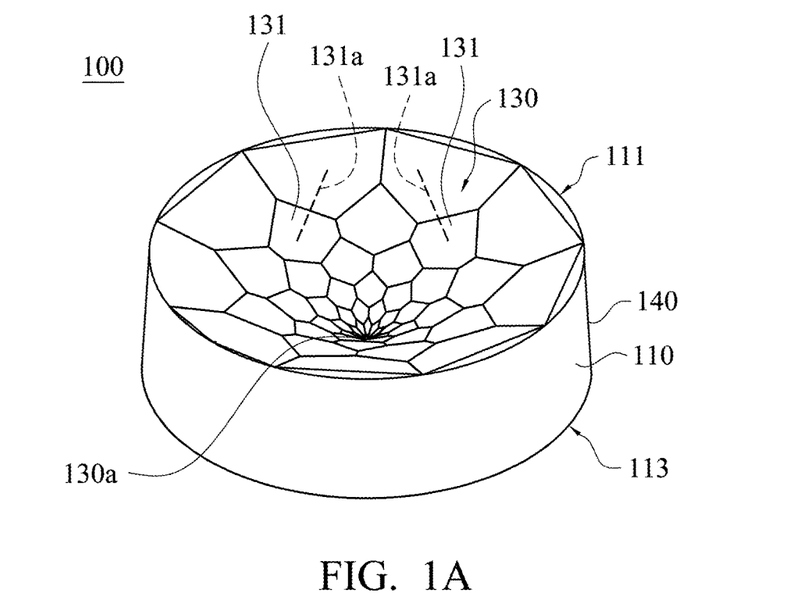
FIG. 1A is a schematic structural diagram showing an optical lens in accordance with a first embodiment of the present invention.
Figure 1B:
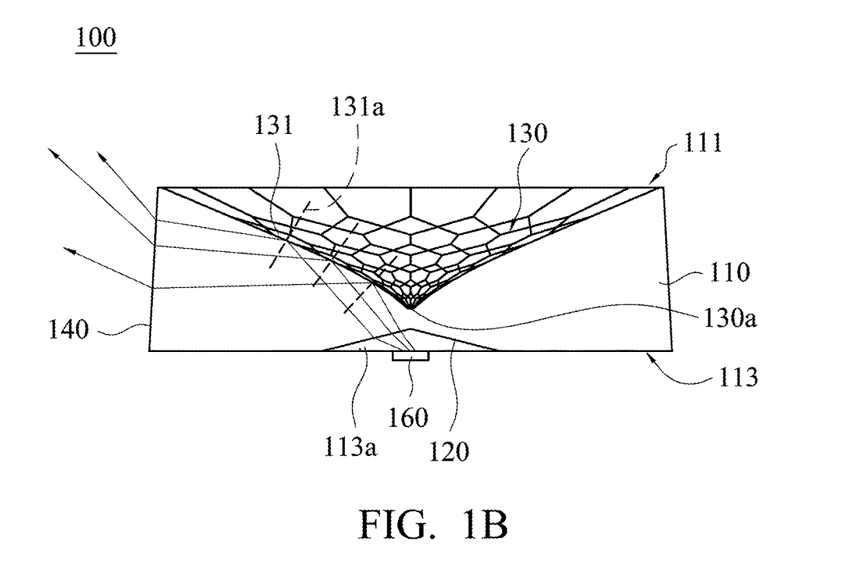
FIG. 1B is a schematic side view of the optical lens in accordance with the first embodiment of the present invention.
Figure 1C:
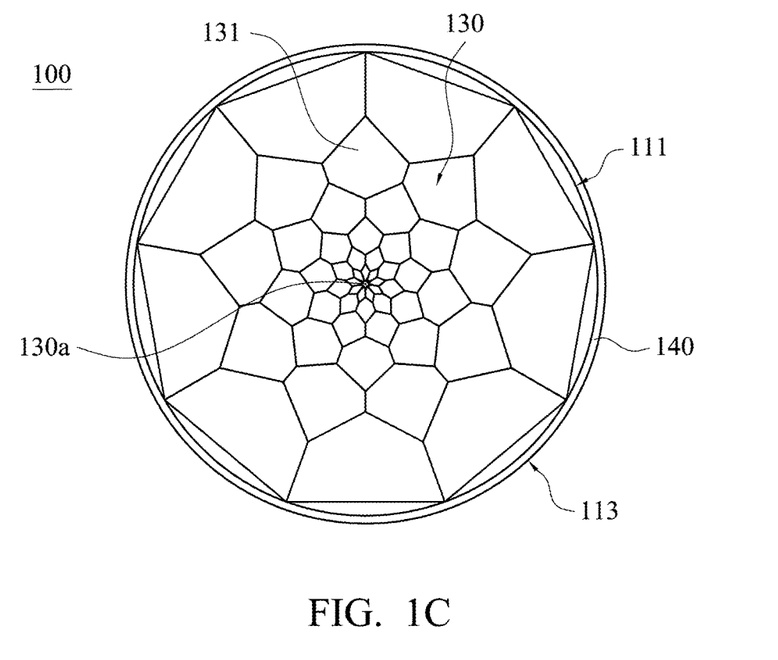
FIG. 1C is a schematic top view of the optical lens in accordance with the first embodiment of the present invention.

Referring to FIG. 1A to FIG. 1C, FIG. 1A to FIG. 1C are a schematic structural diagram, a schematic side view and a schematic top view showing an optical lens 100 in accordance with a first embodiment of the present invention. The optical lens 100 of the present embodiment can be applied to a backlight module, so as to increase and adjust light-emitting angles of a light source in the backlight module, enlarge illumination range, and increase degrees of illumination uniformity of the backlight module.

Referring to FIG. 1A to FIG. 1C again, the optical lens 100 mainly includes a main body 110, a light-incident surface 120, a recessed surface 130 and a light-emitting surface 140. The main body 110 has a top portion 111 and a bottom portion 113 opposite to each other. The light-incident surface 120 is recessed into the bottom portion 113 of the main body 110, and a light-incident space 113a is formed in the bottom portion 113. In other words, the light-incident surface 120 can be defined as an inner surface of the light-incident space 113a. As shown in FIG. 1B, a light source 160 is disposed under the light-incident space 113a of the main body 110, and light beam provided by the light source 160 can enter the main body 110 from the light-incident surface 120. In one embodiment, the light-incident surface 120 has a constant slope, which can be easily processed.

As shown in FIG. 1A to FIG. 1C, the recessed surface 130 is recessed into the top portion 111 of the main body 110. Moreover, the recessed surface 130 is a reflecting surface, and the recessed surface 130 is opposite to the light-incident surface 120. The recessed surface 130 has plural prism surfaces 131, and edges of any two adjacent prism surfaces 131 are connected to each other. In other words, the recessed surface 130 is formed by jointing the prism surfaces 131 together. In one embodiment, the recessed surface 130 is a cone-like surface and has an end point 130a. As shown in FIG. 10, the prism surfaces 131 are arranged radially with respect to the end point 130a. In other embodiments, each of the prism surfaces 131 located away from the end point 130a has an area greater than the prism surfaces 131 located near the end point 130a. In the present embodiment, the prism surfaces 131 are a combination of pentagons and hexagons. In other embodiments, the prism surfaces 131 may be triangular, quadrangular, rhombic, pentagonal, hexagonal fan-shaped polygonal irregular-shaped, or any combination thereof.

Referring to FIG. 1A to FIG. 1C again, in the present embodiment, each of the prism surfaces 131 has a normal line 131a. Moreover, extending directions of these normal lines 131a are different from each other. In other words, these prism surfaces 131 can be different inclined surfaces or curved surfaces. It is noted that, the term "normal lines" as used herein refers to lines vertical to each prism surface 131. Moreover, extending directions of the normal lines of the prism surfaces 131 with different slopes or curvatures are different.

As shown in FIG. 1A and FIG. 1B, the light-emitting surface 140 is a side surface of the main body 110 and connects the top portion 111 and the bottom portion 113 of the main body 110. Therefore, as shown in FIG. 1B, after entering the main body 110 from the light-incident surface 120 and reflected by the prism surfaces 131, the light beam provided by the light source 160 is emitted out from the light-emitting surface 140. In addition, because each prism surface 131 has different slopes or curvatures, after entering the main body 110 from the light-incident surface 120 and emitted towards the prism surfaces 131, these prism surfaces 131 with different slopes or curvatures can respectively reflect the light beam to change the propagation paths of the light beam, so as to enlarge illumination range and increase illumination uniformity. In one embodiment, the light-emitting surface 140 has a constant slope, which can be easily processed.

Figure 2A:
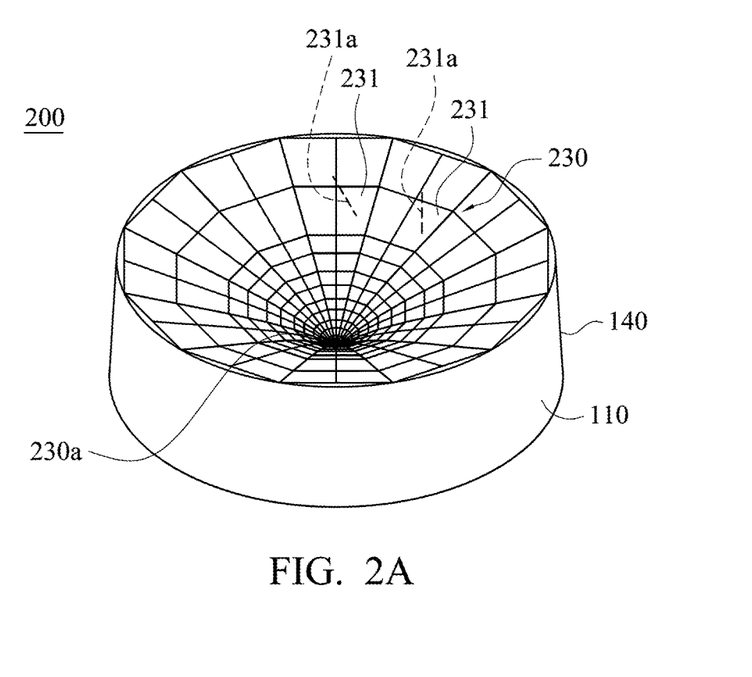
FIG. 2A is a schematic structural diagram showing an optical lens in accordance with a second embodiment of the present invention.
Figure 2B:
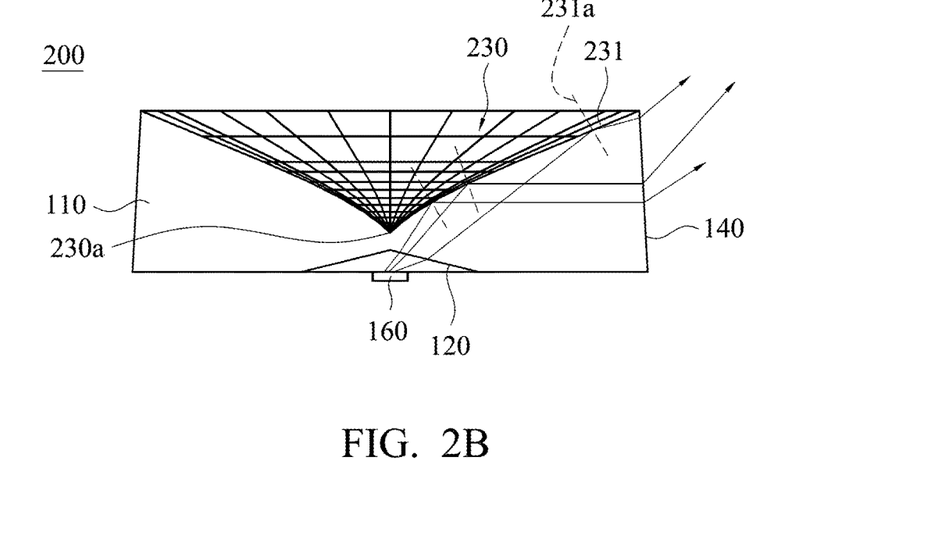
FIG. 2B is a schematic side view of the optical lens in accordance with the second embodiment of the present invention.
Figure 2C:
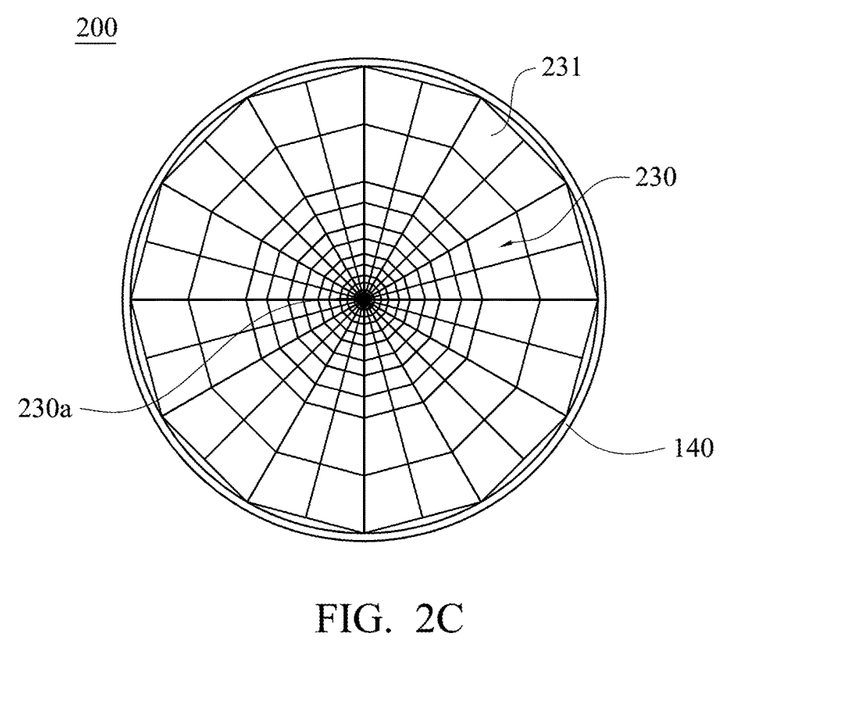
FIG. 2C is a schematic top view of the optical lens in accordance with the second embodiment of the present invention.

In the present invention, the optical lens may have different designs. Referring to FIG. 2A to FIG. 2C, FIG. 2A to FIG. 2C are a schematic structural diagram, a schematic side view and a schematic top view showing an optical lens 200 in accordance with a second embodiment of the present invention. The structure of the optical lens 200 shown in FIG. 2A to FIG. 2C is similar to that of the aforementioned optical lens 100, and the main difference therebetween is that a recessed surface 230 of the optical lens 200 is formed by jointing plural quadrangular prism surfaces 231 together. As shown in FIG. 2A to FIG. 2C, the optical lens 200 also includes the main body 110, the light-incident surface 120, the recessed surface 230 and the light-emitting surface 140. In one embodiment, the light-incident surface 120 and the light-emitting surface 140 respectively have a constant slope.

Referring to FIG. 2A to FIG. 2C again, in the present embodiment, each of the prism surfaces 231 has a normal line 231a. Moreover, extending directions of these normal lines 231a are different from each other. In other words, these prism surfaces 231 can be different inclined surfaces or curved surfaces. In addition, the recessed surface 230 is also a cone-like surface which has an end point 230a. As shown in FIG. 2C, in the present embodiment, each of the prism surfaces 231 is quadrangular, and the prism surfaces 231 are arranged annularly with respect to the end point 230a. Similarly, each of the prism surfaces 231 located away from the end point 230a has an area greater than each of the prism surfaces 231 located near the end point 230a.

Therefore, as shown in FIG. 2B, after entering the main body 110 from the light-incident surface 120 and reflected by the prism surfaces 231, the light beam provided by the light source 160 is emitted out from the light-emitting surface 140, so as to achieve the aforementioned objects and will not be described again herein.

Figure 3A:
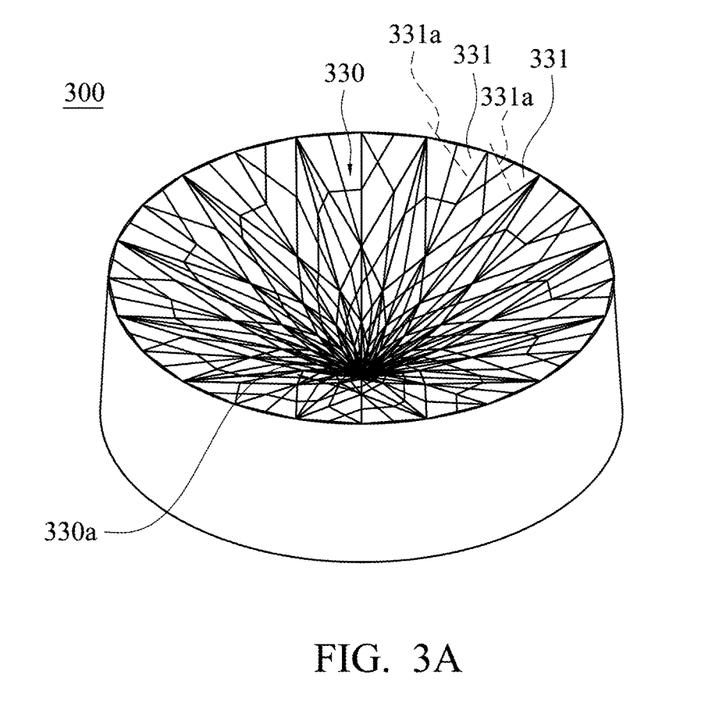
FIG. 3A is a schematic structural diagram showing an optical lens in accordance with a third embodiment of the present invention.
Figure 3B:
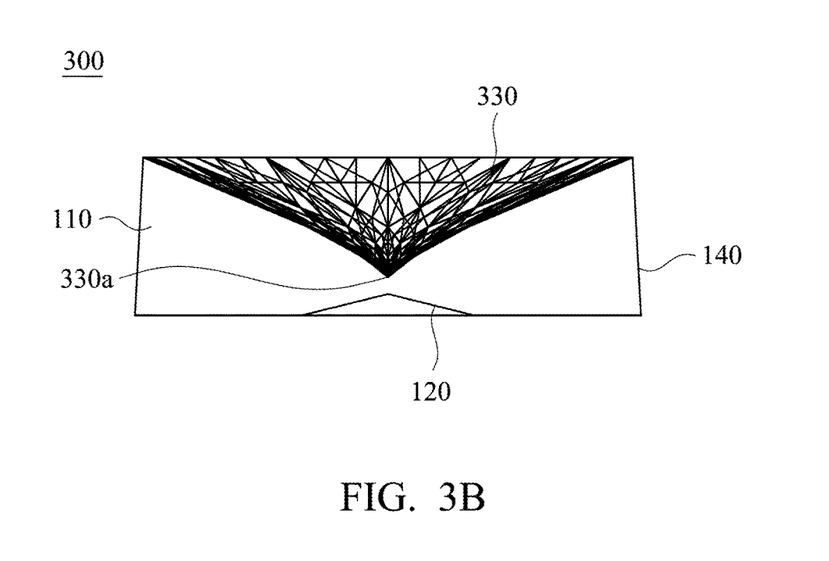
FIG. 3B is a schematic side view of the optical lens in accordance with the third embodiment of the present invention.
Figure 3C:
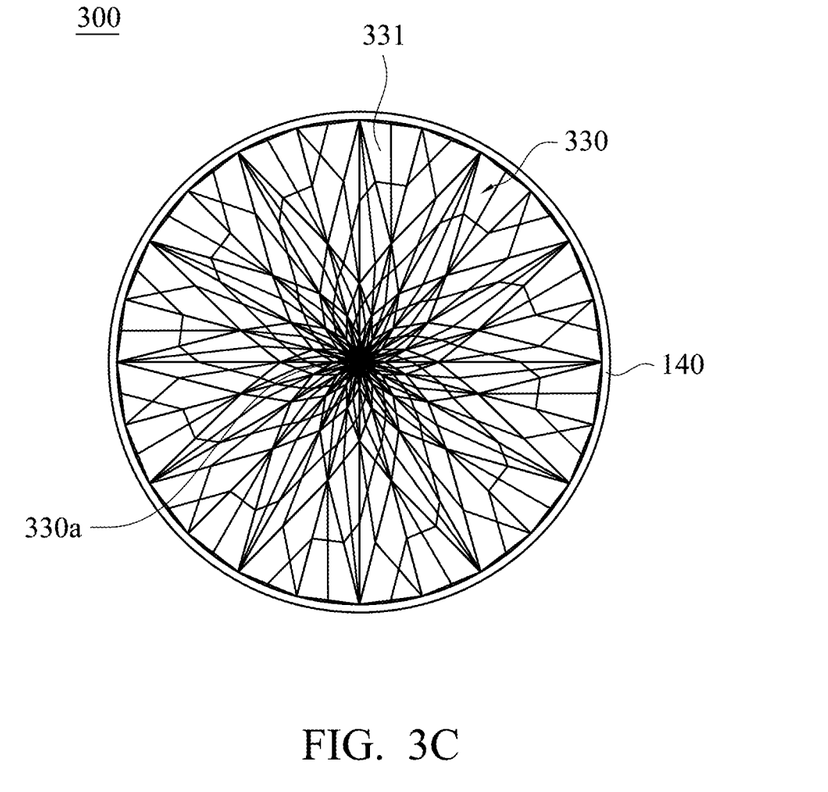
FIG. 3C is a schematic top view of the optical lens in accordance with the third embodiment of the present invention.

Referring to FIG. 3A to FIG. 3C, FIG. 3A to FIG. 3C are a schematic structural diagram, a schematic side view and a schematic top view showing an optical lens 300 in accordance with a third embodiment of the present invention. The structure of the optical lens 300 shown in FIG. 3A to FIG. 3C is similar to that of the aforementioned optical lens 200, and the main difference therebetween is that a recessed surface 330 of the optical lens 300 is formed by jointing prism surfaces 331 with different shapes together. As shown in FIG. 3A to FIG. 3C, the optical lens 300 also includes the main body 110, the light-incident surface 120, the recessed surface 330 and the light-emitting surface 140. In one embodiment, the light-incident surface 120 and the light-emitting surface 140 respectively have a constant slope, which can be easily processed.

Referring to FIG. 3A to FIG. 3C again, in the present embodiment, each of the prism surfaces 331 has a normal line 331a. Moreover, extending directions of these normal lines 331a are different from each other. In other words, these prism surfaces 331 can be different inclined surfaces or curved surfaces. In addition, the recessed surface 330 is also a cone-like surface which has an end point 330a. As shown in FIG. 3C, in the present embodiment, some of the prism surfaces 331 are quadrangular, the others are triangular, and these prism surfaces 331 are arranged radially with respect to the end point 330a, so as to achieve the aforementioned objects and will not be described again herein.

Figure 4A:
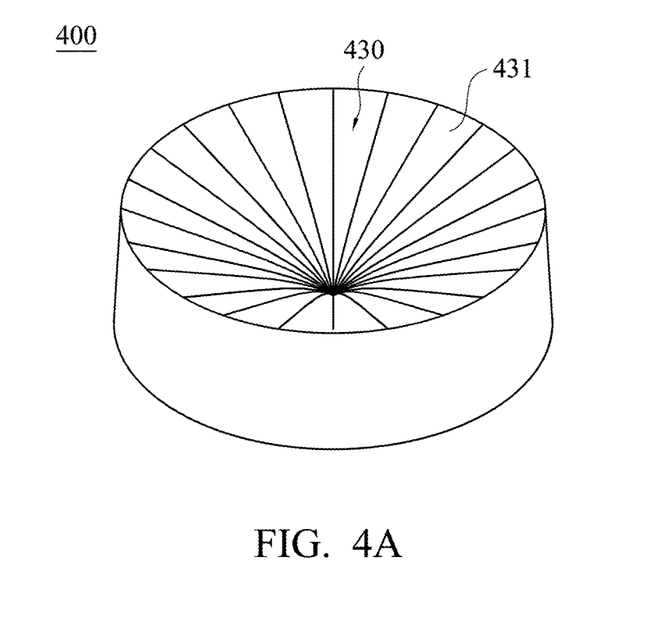
FIG. 4A is a schematic structural diagram showing an optical lens in accordance with a fourth embodiment of the present invention.
Figure 4B:
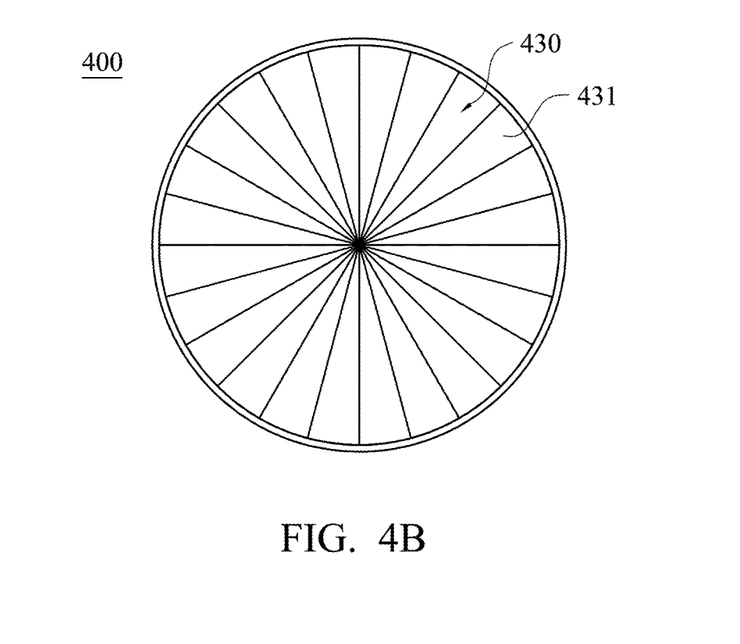
FIG. 4B is a schematic top view of the optical lens in accordance with the fourth embodiment of the present invention.

Referring to FIG. 4A and FIG. 4B, 4A and FIG. 4B are a schematic structural diagram and a top view showing an optical lens 400 in accordance with a fourth embodiment of the present invention. The structure of the optical lens 400 shown in FIG. 4A and FIG. 4B is similar to that of the aforementioned optical lens 300, and the main difference therebetween is that a recessed surface 430 of the optical lens 400 is formed by jointing fan-shaped prism surfaces 431 together, so as to achieve the aforementioned objects and will not be described again herein.

Figure 5A:
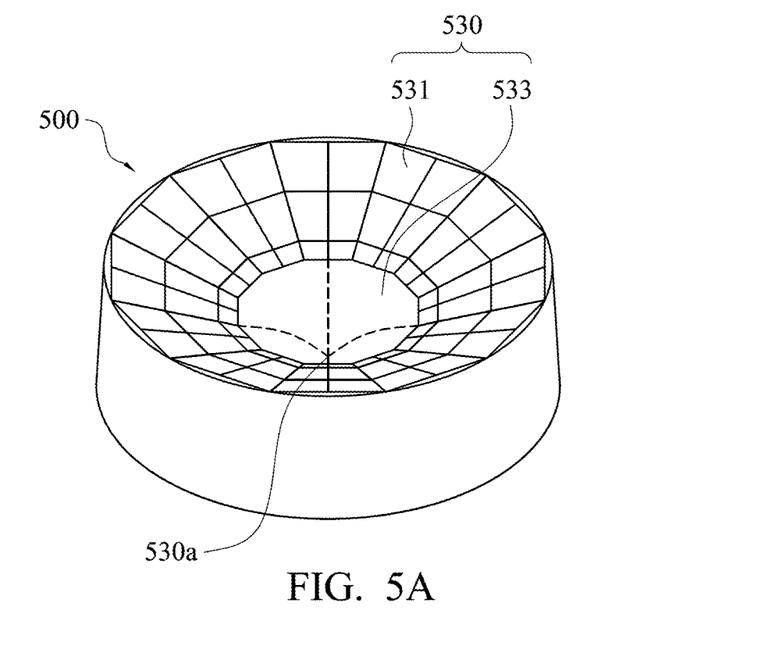
FIG. 5A is a schematic structural diagram showing an optical lens in accordance with a fifth embodiment of the present invention.
Figure 5B:
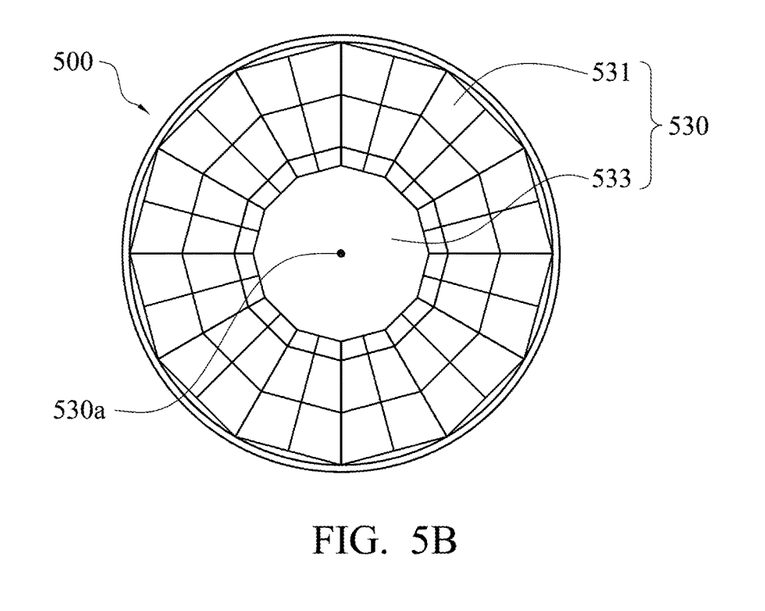
FIG. 5B is a schematic top view of the optical lens in accordance with the fifth embodiment of the present invention.

It is noted that, the recessed surfaces 130, 230, 330 and 430 shown in FIG. 1A to FIG. 4B are respectively formed by jointing the prism surfaces 131, 231, 331 and 431 together. In other embodiments, the recessed surfaces 131, 231, 331 and 431 440 may have different designs. Referring to FIG. 5A and FIG. 5B, 5A and FIG. 5B are a schematic structural diagram and a top view showing an optical lens 500 in accordance with a fifth embodiment of the present invention. The structure of the optical lens 500 shown in FIG. 5A and FIG. 5B is similar to that of the aforementioned optical lens 100, 200, 300 or 400, and the main difference therebetween is that a recessed surface 530 of the optical lens 500 is formed by jointing prism surfaces 531 and at least one optical surface 533 together. In other words, one portion of the recessed surface 530 has the prism surfaces 531, and the other portion of the recessed surface 530 without the prism surfaces 531 is defined as the optical surface 553. Therefore, the propagation paths of the light beam can be controlled by the prism surfaces 531 and the optical surface 533.

As shown in FIG. 5A and FIG. 5B, the recessed surface 530 is a cone-like surface and has an end point 530a. In comparison with the optical surface 533, the prism surfaces 531 are located away from the end point 530a, in which the prism surfaces 531 are arranged annularly with respect to the end point 530a. The optical surface 533 also has a function of reflecting light and is located near the end point 530a.

Figure 6A:
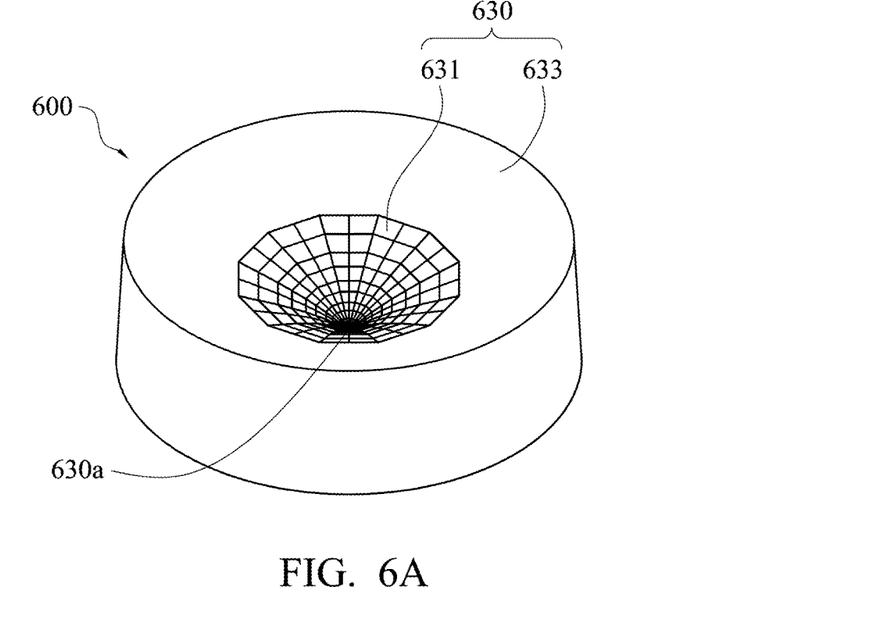
FIG. 6A is a schematic structural diagram showing an optical lens in accordance with a sixth embodiment of the present invention.
Figure 6B:
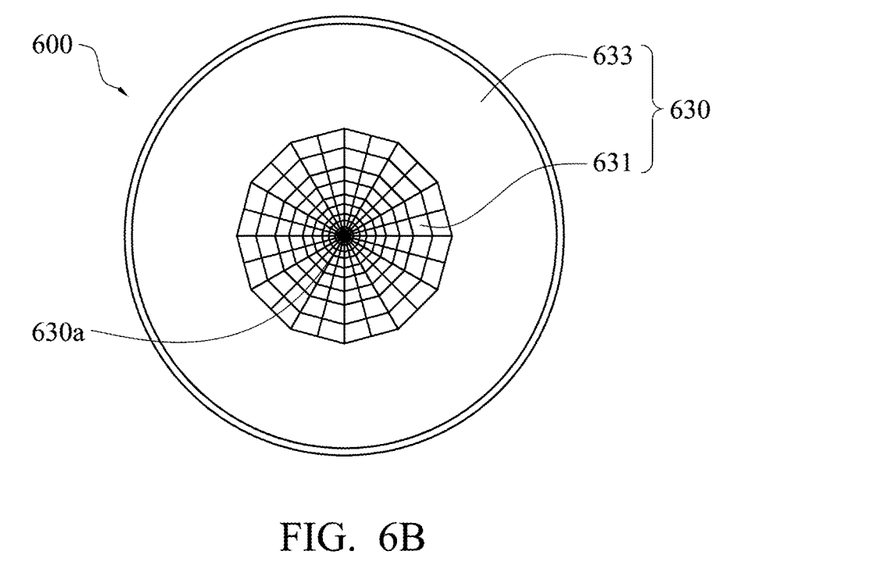
FIG. 6B is a schematic top view of the optical lens in accordance with the sixth embodiment of the present invention.

Referring to FIG. 6A and FIG. 6B, 6A and FIG. 6B are a schematic structural diagram and a top view showing an optical lens 600 in accordance with a sixth embodiment of the present invention. The structure of the optical lens 600 shown in FIG. 6A and FIG. 6B is similar to that of the aforementioned optical lens 500, and a recessed surface 630 of the optical lens 600 is also formed by jointing prism surfaces 631 and at least one optical surface 633 together. The main difference between the optical lens 500 and the optical lens 600 is that the prism surfaces 631 and the optical surface 633 have different arrangement manners.

As shown in FIG. 6A and FIG. 6B, the recessed surface 630 is a cone-like surface and has an end point 630a. The prism surfaces 631 are located near the end point 630a, in which the prism surfaces 631 are arranged annularly with respect to the end point 630a. The optical surface 533 also has a function of reflecting light, and the optical surface 533 is located away from the end point 630a.

Figure 7A:
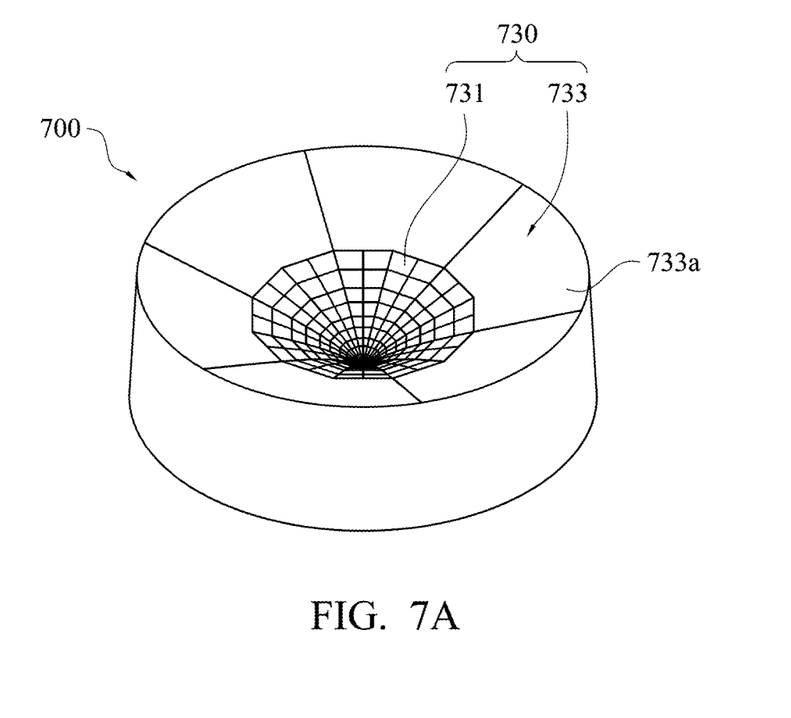
FIG. 7A is a schematic structural diagram showing an optical lens in accordance with a seventh embodiment of the present invention.
Figure 7B:
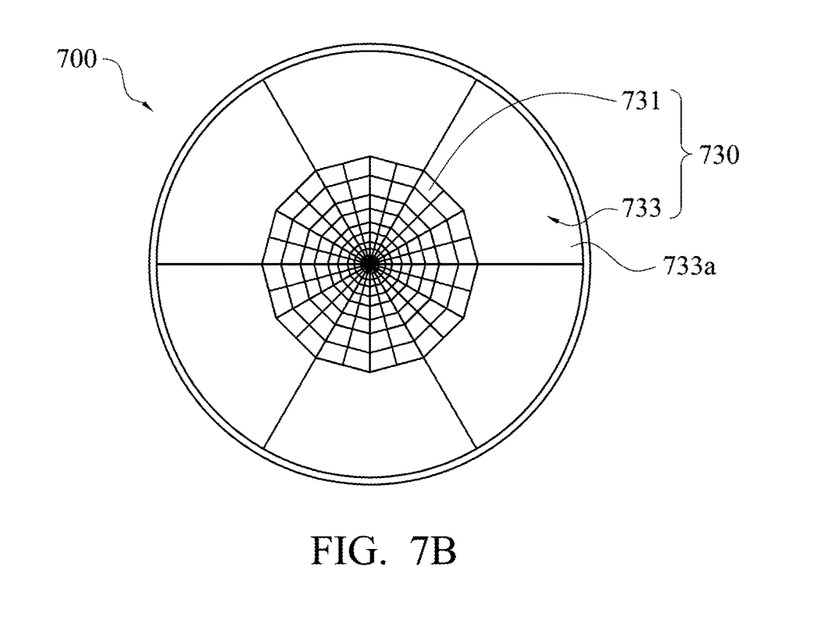
FIG. 7B is a schematic top view of the optical lens in accordance with the seventh embodiment of the present invention.
Figure 7C:
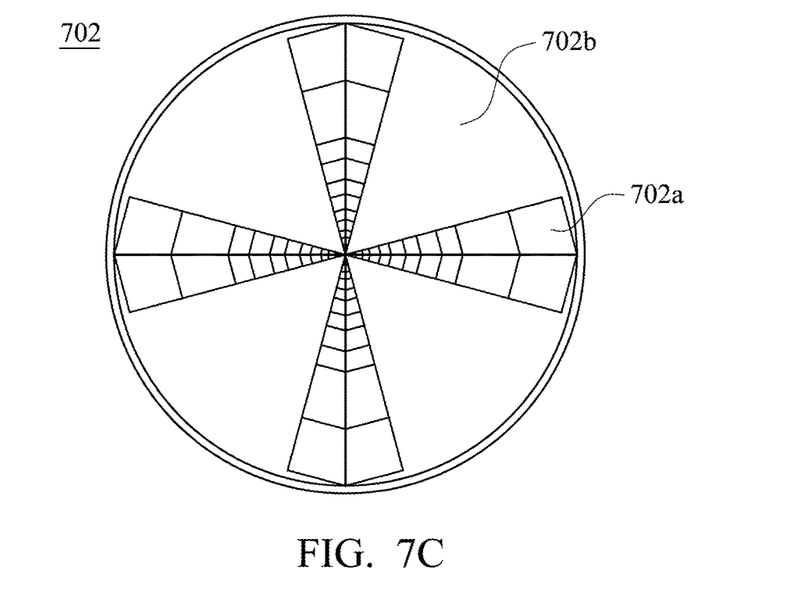
FIG. 7C is a schematic top view of the optical lens in accordance with a eighth embodiment of the present invention.
Figure 7D:
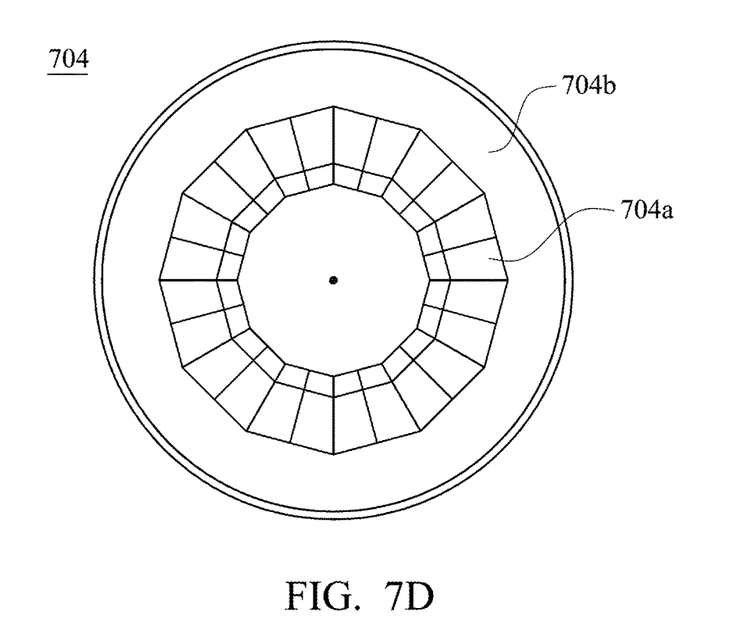
FIG. 7D is a schematic top view of the optical lens in accordance with a ninth embodiment of the present invention.
Figure 7E:
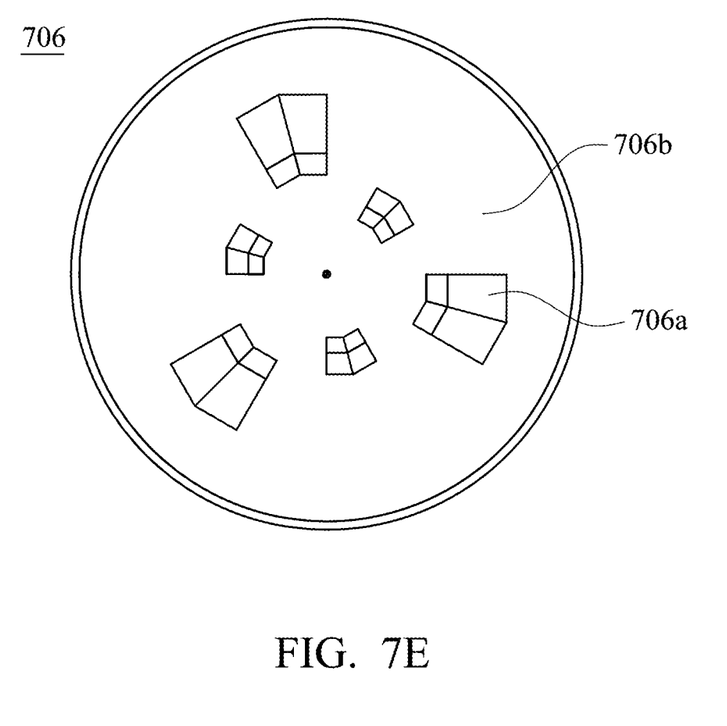
FIG. 7E is a schematic top view of the optical lens in accordance with a tenth embodiment of the present invention.

Referring to FIG. 7A and FIG. 7B, 7A and FIG. 7B are a schematic structural diagram and a top view showing an optical lens 700 in accordance with a seventh embodiment of the present invention. The structure of the optical lens 700 shown in FIG. 7A and FIG. 7B is similar to that of the aforementioned optical lens 600, and a recessed surface 730 of the optical lens 700 is also formed by jointing prism surfaces 731 and at least one optical surface 733 together. The main difference between the optical lens 700 and the optical lens 600 is that the optical surface 733 includes more than two optical surface units 733a, so that the optical surface units 733a can locally control propagation paths of the light beam. In other embodiments, the prism surfaces and the optical surface may have different arrangement manners. Referring to FIG. 7C to FIG. 7E, FIG. 7C to FIG. 7E are schematic top views of the optical lenses 702, 704 and 706 respectively in accordance with eighth, ninth and tenth embodiments of the present invention. As shown in FIG. 7C, prism surfaces 702a and an optical surface 702b of the optical lens 702 are arranged alternatively and radially. As shown in FIG. 7D, prism surfaces 704a and an optical surface 704b of the optical lens 704 are arranged alternatively and annularly. As shown in FIG. 7E, prism surfaces 706a and an optical surface 706b of the optical lens 706 are arranged randomly.

Figure 8:
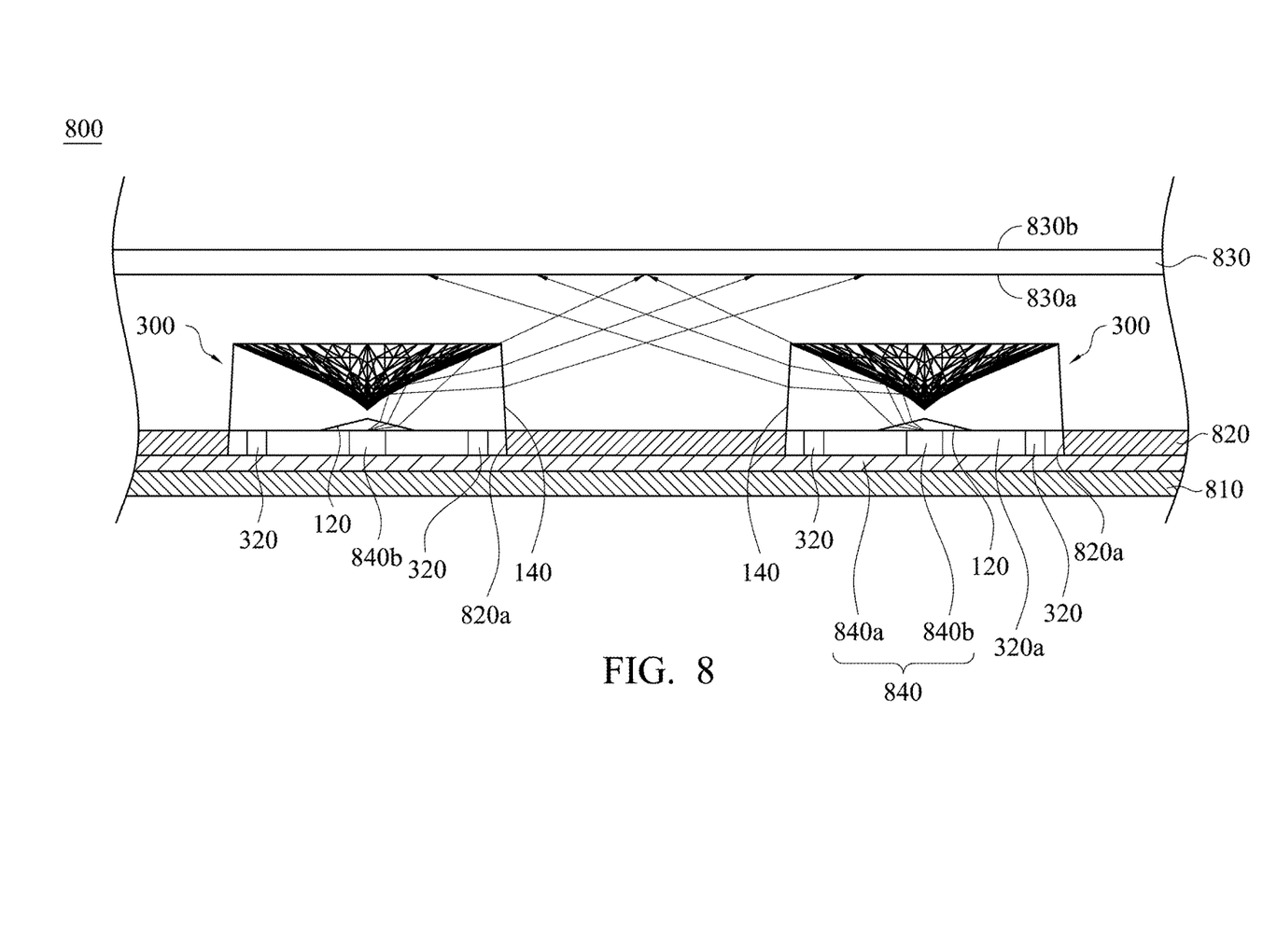
FIG. 8 is a schematic structural diagram showing a backlight module in accordance with an embodiment of the present invention.

Simultaneously referring to FIG. 3B and FIG. 8, FIG. 8 is a schematic structural diagram showing a backlight module 800 in accordance with an embodiment of the present invention. The backlight module 800 of the present embodiment includes a back plate 810, a reflector 820, an optical plate 830, at least one light source 840 and at least one optical lens 300. It is noted that, the optical lens 300 is merely used as an example for explanation in the present embodiment. In other embodiments, other optical lenses also can be applied to the backlight module 800. In some embodiments, the backlight module 800 is a direct type backlight module, and the aforementioned optical plate 830 is a diffusing plate. In other embodiments, the backlight module 800 can be an edge-type backlight module, and the aforementioned optical plate 830 is a light guide plate.

Referring to FIG. 8 again, the light source 840 is disposed on the back plate 810. The light source 840 includes a circuit board 840a and at least one light-emitting unit 840b disposed on the circuit board 840a. The number of the optical lens 300 is corresponding to that of the light-emitting unit 840b, and the optical lens 300 is correspondingly disposed above the light-emitting unit 840b. In some embodiments, the optical lens 300 has at least one connecting pin 320 disposed on a bottom portion of the optical lens 300. Therefore, the optical lens 300 can be disposed on the circuit board 840a through the connecting pin 320, and an accommodating space 320a is formed between the optical lens 300 and the circuit board 840a accordingly. Therefore, the light-emitting unit 840b can be disposed in the accommodating space 320a and be located under the light-incident surface 120 of the optical lens 300.

As shown in FIG. 8, the reflector 820 has plural engaging portions which are configured as through holes 820a in this embodiment. Therefore, the reflector 820 can be mounted on the optical lens 300 through the through holes 820a. The optical plate 830 is disposed above the reflector 820 and has a first surface 830a and a second surface 830b. The first surface 830a is a light-incident surface, and the second surface 830b is a light-emitting surface. Therefore, after entering the main body 110 from the light-incident surface 120 of the optical lens 300, light beam provided by the light source 840 is reflected by the prism surfaces 331 and emitted out from the light-emitting surface 140. After being emitted out from the light-emitting surface 140 of the optical lens 300, one portion of the light beam enters the optical plate 830 from the first surface 830a and is emitted out from the second surface 830b, and the other portion of the light beam is reflected by the reflector 820 and emitted out from the optical plate 830. It can be seen from the above description that after the light beam is reflected and refracted by the optical lens 300, light-emitting angle of the light beam will be increased. Therefore, when the number of the light sources 840 is reduced and/or the distance between any two adjacent light sources 840 is increased, light beam generated by the light source 840 still can be adequately mixed therebetween, so that the thickness of the backlight module 800 can be decreased, and the illumination uniformity of the backlight module 800 can be maintained or even be enhanced.

Figure 9:
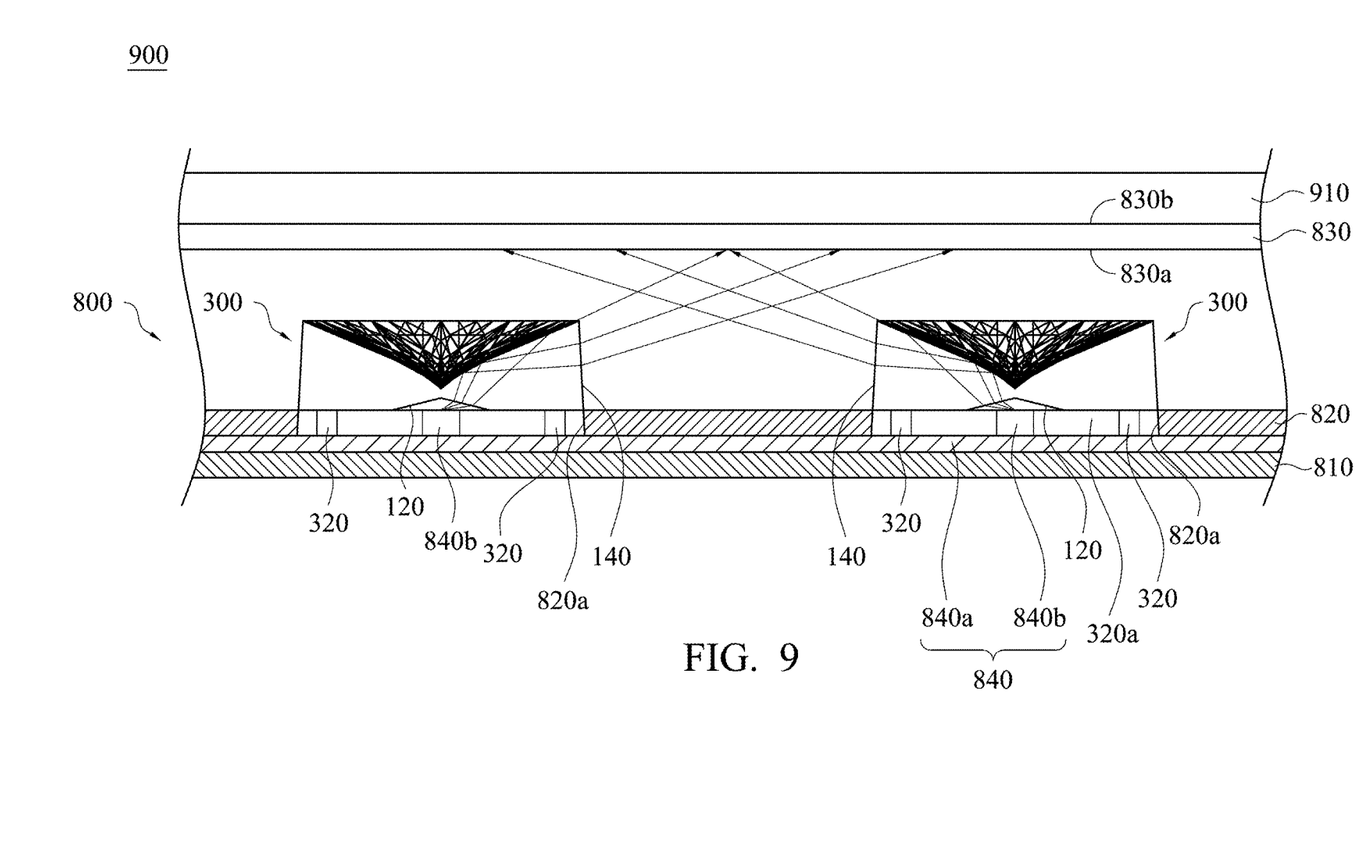
FIG. 9 is a schematic structural diagram showing a display device in accordance with an embodiment of the present invention.

Referring to FIG. 9, FIG. 9 is a schematic structural diagram showing a display device 900 in accordance with an embodiment of the present invention. The display device 900 in the present embodiment includes a backlight module 800 and a display panel 910. As shown in FIG. 9, the display panel 910 is disposed above the optical plate 830 of the backlight module 800. Light beam emitted from the second surface 830b of the optical plate 830 can enter the display panel 910, so as to achieve the aforementioned objects.

According to the aforementioned embodiments of the present invention, the optical lens of the invention uses a recessed surface as a reflecting surface by jointing the prism surfaces with different extending directions of normal lines together, so that the propagation paths of the light beam can be adjusted, and the light-emitting angles can be controlled accordingly. In addition, the propagation paths of the light beam can also be locally controlled by changing the arrangement manners, sizes or shapes of the prism surfaces. Therefore, the number of the optical lenses applied to the backlight module or the display device, and the overall thickness of the backlight module can be reduced, and the illumination uniformity of the backlight module or the display device can be enhanced. In addition, the light-incident surface or the light-emitting surface of each of the optical lenses in the present invention can be designed to have a constant slope, thereby simplifying the manufacturing process of the optical lenses, thus increasing forming precision of the optical lenses.

Although the present invention has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. An optical lens, comprising:
   a main body having a top portion and a bottom portion;
   a light-incident surface recessed into the bottom portion of the main body;
   a recessed surface recessed into the top portion of the main body and opposite to the light-incident surface, wherein the recessed surface has a plurality of prism surfaces, and each of the prism surfaces has a normal line, and directions of the normal lines are different from each other; and
   a light-emitting surface connecting the top portion and the bottom portion;
   wherein the recessed surface is a cone-like surface which has an end point, and the prism surfaces are arranged annularly with respect to the end point; and
   wherein each of the prism surfaces located away from the end point has an area greater than each of the prism surfaces located near the end point.

2. The optical lens of claim 1, wherein edges of any two adjacent prism surfaces are connected to each other.

3. The optical lens of claim 1, wherein the recessed surface is a cone-like surface which has an end point, and the prism surfaces are arranged radially with respect to the end point.

4. The optical lens of claim 1, wherein the recessed surface is a cone-like surface which has an end point, and the prism surfaces are arranged annularly with respect to the end point.

5. The optical lens of claim 1, wherein each of the prism surfaces is triangular, quadrangular, rhombic, pentagonal, hexagonal fan-shaped polygonal irregular-shaped, or any combination thereof.

6. The optical lens of claim 1, wherein the recessed surface further comprises at least one optical surface, and the recessed surface is formed by connecting the prism surfaces and the optical surface together.

7. The optical lens of claim 1, wherein the recessed surface is formed by connecting the prism surfaces together.

8. The optical lens of claim 1, wherein the light-incident surface has a constant slope.

9. The optical lens of claim 1, wherein the light-emitting surface has a constant slope.

10. A backlight module, comprising the optical lens according to claim 1.

11. A display device, comprising the backlight module according to claim 10; and a display panel disposed above the backlight module.

12. A backlight module, comprising:
    a back plate;
    a reflector disposed on the back plate;
    at least one light source disposed on the back plate, wherein the light source is used to provide light beam;
    an optical lens disposed on the light source, wherein the optical lens comprises:
      a main body having a top portion and a bottom portion;
      a light-incident surface recessed into the bottom portion of the main body;
      a recessed surface recessed into the top portion of the main body and opposite to the light-incident surface, wherein the recessed surface has a plurality of prism surfaces, and each of the prism surfaces has a normal line, and directions of the normal lines are different from each other; and
      a light-emitting surface connecting the top portion and the bottom portion; and
    an optical plate disposed above the reflector;
    wherein, after entering the main body of the optical lens from the light-incident surface, the light beam provided by the light source is reflected by the prism surfaces, and is emitted out from the light-emitting surface and then is emitted out from the optical plate;
    wherein, the light source comprises a circuit board and at least one light-emitting unit disposed on the circuit board, wherein the circuit board is disposed on the back plate, and the light-emitting unit is disposed under the optical lens;
    wherein the main body has at least one connecting pin disposed on the bottom portion, and the optical lens is disposed on the circuit board through the connecting pin so as to form an accommodating space between the optical lens and the circuit board.

13. The backlight module of claim 12, wherein the main body further comprises a light-incident space, the light-incident surface is an inner surface of the light-incident space, and the light-emitting unit is disposed under the light-incident space.

14. A display device, comprising the backlight module according to claim 12; and a display panel disposed above the backlight module.

15. An optical lens, comprising:
    a main body having a top portion and a bottom portion;
    a light-incident surface recessed into the bottom portion of the main body;
    a recessed surface recessed into the top portion of the main body and opposite to the light-incident surface, wherein the recessed surface has a plurality of fan-shaped prism surfaces; and
    a light-emitting surface connecting the top portion and the bottom portion;
    wherein, the recessed surface is a cone-like surface which has an end point, and the fan-shaped prism surfaces are arranged annularly with respect to the end point; and
    wherein, each of the fan-shaped prism surfaces has a first side edge and a second side edge, and a distance away from the end point between the first side edge and the second side edge is greater than a distance near the end point between the first side edge and the second side edge.

16. A backlight module, comprising the optical lens according to claim 15.

17. A display device, comprising the backlight module according to claim 16; and a display panel disposed above the backlight module.

* * * * *